(12) United States Patent
Christensen et al.

(10) Patent No.: US 7,824,657 B2
(45) Date of Patent: Nov. 2, 2010

(54) FABRICATION OF HIERARCHICAL ZEOLITES

(75) Inventors: Claus Hviid Christensen, Lynge (DK); Kake Zhu, Shanghai (CN); Marina Kegnaes, Copenhagen Ø (DK); Kresten Egeblad, Valby (DK)

(73) Assignee: Haldor Topsoe A/S, Lyngby (DK)

( * ) Notice: Subject to any disclaimer, the term of this patent is extended or adjusted under 35 U.S.C. 154(b) by 331 days.

(21) Appl. No.: 11/819,444

(22) Filed: Jun. 27, 2007

(65) Prior Publication Data

US 2008/0014140 A1    Jan. 17, 2008

(30) Foreign Application Priority Data

Jul. 12, 2006 (DK) ............................... 2006 00967

(51) Int. Cl.
*C01B 39/02* (2006.01)
*C01B 33/02* (2006.01)

(52) U.S. Cl. .................. 423/701; 423/702; 423/703

(58) Field of Classification Search ............... 423/701, 423/702, 703
See application file for complete search history.

(56) References Cited

U.S. PATENT DOCUMENTS

| | | | | |
|---|---|---|---|---|
| 4,372,931 A | * | 2/1983 | Ambs | ............... 423/701 |
| 4,372,941 A | * | 2/1983 | Ryan | ............... 435/15 |
| 6,358,486 B1 | * | 3/2002 | Shan et al. | ............... 423/326 |
| 6,565,826 B2 | | 5/2003 | Jacobsen et al. | |
| 6,696,258 B1 | * | 2/2004 | Wei et al. | ............... 435/7.2 |
| 7,211,239 B2 | * | 5/2007 | Muller et al. | ............... 423/702 |

FOREIGN PATENT DOCUMENTS

| | | |
|---|---|---|
| CN | 101003380 A | 7/2007 |
| EP | 1 106 575 A2 | 6/2001 |
| WO | WO 2004/052537 | 6/2004 |

OTHER PUBLICATIONS

Z. Yang et al., "Zeolite ZSM-5 with Unique Supermicropores Synthesized Using Mesoporous Carbon as a Template," *Adv. Mater.* 2004, vol. 16, No. 8, Apr. 19, pp. 727-732.

S. Han et al., Direct Fabrication of Mesoporous Carbons Using in-situ polymerized Silica Gel Networks as a Template, *Carbon* 41 (2003), pp. 1525-1532.

C.J.H. Jacobsen, et al., "Mesoporous Zeolite Single Crystals," XP-001051450, American Chemical Society, 2000.

Y. Tong, "Synthesis of Monolithic Zeolite Beta with Hierarchical Porosity Using Carbon as a Transitional Template," *Chemistry of Materials*, 2006, vol. 18, pp. 4218-4220.

(Continued)

*Primary Examiner*—David M Brunsman
(74) *Attorney, Agent, or Firm*—Dickstein Shapiro LLP

(57) ABSTRACT

A method for producing zeolite or zeotype crystals with a hierarchical pore system having both pores with average diameter between 0.3-2 nm and pores with an average diameter size larger than 4 nm in diameter, comprising the steps of applying a carbohydrate or a carbohydrate solution onto a zeolite precursor material or into a zeolite precursor composition, partly or fully decomposing the carbohydrate, crystallizing the zeolite, removing the partly or fully decomposed carbohydrate by calcination or combustion.

7 Claims, 9 Drawing Sheets

OTHER PUBLICATIONS

M. Kustova et al., "Versatile Route to Zeolite Single Crystals with Controlled Mesoporosity: in situ Sugar Decomposition for Templating of Hierarchical Zeolites," *Chemistry of Materials*, vol. 19, No. 12, May 22, 2007, pp. 2915-2917.

M. Kustova et al., "Versatile Route to Zeolite Single Crystals with Controlled Mesoporosity: in situ Sugar Decomposition for Templating of Hierarchical Zeolites," *Chemistry of Materials*, vol. 19, No. 12, Jun. 12, 2007, pp. 2915-2917.

F. Ehrburger-Dolle, et al., "Small Angle X-ray Scattering and Electron Microscopy Investigation of Silica and Carbon Replicas with Ordered Porosity," XP-002527638, Langmuir, 2003, vol. 19, pp. 4303-4308.

* cited by examiner

FABRICATION OF HIERARCHICAL ZEOLITES

This invention relates to a method for preparing zeolite materials with a hierarchical pore system, i.e., with the ordinary micropores having an average diameter between 0.3 and 2 nm and also with mesopores having an average pore diameter between 2 nm and 100 nm. In particular, the invention relates to a method for preparing crystalline zeolite materials with a hierarchical pore system with at least 5 vol. % micropores, said micropores having an average pore diameter between 0.3 and 2 nm, and 95 vol. % or less of mesopores having an average pore diameter between 2 and 100 nm.

BACKGROUND OF THE INVENTION

Zeolites are used in numerous industrial applications as catalysts, ion-exchangers and molecular sieves. The superior performance is often related to the presence of well-defined micropores in the zeolite structure. However, in many cases the sole presence of micropores also imposes some limitations on their applicability.

It has been shown that by introduction of a mesopore system in some or all of the zeolite crystals improved performance can be obtained in a variety of applications. Previously, this has been achieved elegantly by applying a synthesis gel with zeolite precursor composition within the pore system and on the surface of a particulate matrix having pre-determined pore structure and particle size followed by subjecting this mixture to crystallizing conditions and finally removing the matrix material.

This method has proven quite versatile, but it also has some important drawbacks. First of all, it requires that a particulate matrix with suitable pore structure is available such as expensive mesoporous carbons. Additionally, the manufacturing steps in this method are quite laborious, and finally the method is mostly applicable to the synthesis of mesoporous zeolites that are available from tetraethyl orthosilicate (TEOS) as the silicon source (U.S. Pat. No. 6,565,826).

WO-A-2004/052537 describes a method for the production of amorphous silica materials with at least about 97 vol. % mesopores, and which are prepared from a synthesis mixture containing silica source(s), heteroatom source(s) and pore-forming organic templating agent (s).

SUMMARY OF THE INVENTION

The present invention relates to a different, improved and more versatile method for producing zeolites featuring mesopores. Specifically, it is found that by partly or fully decomposing a carbohydrate loaded onto a zeolite precursor material, e.g. silica or alumina prior to introducing this zeolite precursor material in the zeolite synthesis, it is possible to obtain mesoporous zeolite crystals when the partly or fully decomposed carbohydrate is combusted after crystallization of the zeolite. Along the same lines, it is discovered that by applying a carbohydrate into a zeolite precursor composition, it is surprisingly possible to achieve a similarly mesoporous zeolite product.

Hence, according to the invention we provide a method for producing zeolite or zeotype crystals with a hierarchical pore system having both pores with average diameter between 0.3-2 nm and pores with an average diameter size larger than 4 nm in diameter comprising the steps of:

applying a carbohydrate or a carbohydrate solution onto a zeolite precursor material or into a zeolite precursor composition, partly or fully decomposing the carbohydrate,
crystallizing the zeolite,
removing the partly or fully decomposed carbohydrate by calcination or combustion.

As used herein the term "zeotype crystals" means zeolite type crystals.

In a preferred embodiment, the invention provides a method for preparing crystalline zeolite materials with a hierarchical pore system in which the ordinary micropores have an average diameter between 0.3 and 2 nm and the mesopores an average pore diameter between 2 nm and 100 nm. Preferably, the hierarchical pore system of the crystalline zeolites have at least 5 vol. % micropores, said micropores having an average pore diameter between 0.3 and 2 nm, and 95 vol. % or less of mesopores having an average pore diameter above 4 nm, such as between 2 and 100 nm, often 20 to 50 nm or 20 to 30 nm.

It would be understood that the mesopores are formed within the zeolite crystals and therefore the process of formation of such pores is intra-crystalline. This contrasts processes in which the formation of pores occurs in between zeolite crystals (inter-crystalline).

In one embodiment of the invention the carbohydrate, which is preferably sucrose or sugar, is applied as an aqueous solution. Hence, a zeolite precursor material or a zeolite precursor composition, such as for instance silica gel, may be impregnated with an aqueous solution of the carbohydrate to incipient wetness. The mesoporous volume can be tailored depending on the concentration of the aqueous solution of the carbohydrate.

Sucrose is particularly attractive because of its availability, low cost compared to commercial mesoporous carbons such as carbon black and dissolution properties. A suitable aqueous solution is also syrup, which is readily available and quite inexpensive. Other alternatives include using melted sugar, basic or acid sugar aqueous solution, and solutions of sugar in organic solvents such as ethanol or methanol.

Hence, by the invention a simple, inexpensive method is provided for increasing the pore size of single zeolite crystals, which otherwise predominantly possess a microporous structure. The need of expensive raw materials is avoided.

The carbohydrate is partly or fully decomposed by calcination in an inert gas such as Ar. The carbohydrate is partly or fully decomposed at a temperature between 90 and 900° C., preferably between 120 and 600° C. More preferably, the carbohydrate is partly or fully decomposed by calcining the zeolite precursor material or zeolite precursor composition containing the carbohydrate in an inert gas at 450° C. for at least 10-15 hrs. For instance, silica gel impregnated with sucrose and calcined in an inert gas at 450° C. for 15 hrs results in the production of carbon particles by decomposition of the sucrose inside the silica gel. Thus, the production of carbon particles in the mesoporous size range occurs during operation.

The resulting silica-carbon composite is then mixed with a template mixture containing a base and an organic template such as TPAOH (tetrapropylammonium hydroxide) in order to produce a zeolite synthesis gel. The zeolite synthesis gel is then crystallized. The zeolite is crystallized at a temperature between 70 and 300° C. in an autoclave, preferably at 180° C., for 24 h or more.

In a subsequent calcination in air or combustion, the organic template and the decomposed carbohydrate (in the form of carbon particles) are removed. The calcination or combustion is conducted at a temperature above 300° C., preferably between 400 and 700° C. More preferably a controlled combustion is conducted by combusting the crystallized zeolite in air at 550° C. for 20 h. Upon calcination in air or combustion, zeolite crystals are formed now containing both a micropore and a mesoporous structure. The average size (diameter) of the produced zeolite crystals ranges from 0.5 to 10 μm, preferably about 1 μm with dimensions 2×1×1 μm$^3$.

To further increase the simplicity of the method of producing the zeolite crystals, in a preferred embodiment of the invention the steps of partly or fully decomposing the carbohydrate and crystallizing the zeolite are conducted as a combined single step. Preferably, this step is conducted at a temperature between 80 and 400° C. Accordingly, the silica precursor material or composition is combined with the carbohydrate and then mixed with the base and a suitable template in order to form a zeolite gel. Crystallization of zeolite and decomposition of the carbohydrate is subsequently conducted in a single step by transferring the zeolite gel to an autoclave, heating at for instance 180° C. for 24 h or more and calcining in an inert gas at about 400° C. for about 10-15 h or about 850° C. for 5 h or more. The resulting gel may then be treated in an autoclave again and heated at 180° C. for 24 h or more, and subsequently the organic template and decomposed carbohydrate are removed by calcination in air or combustion.

The hierarchical crystalline zeolites obtained by the present invention present a bimodal structure and find a wide range of applications, particularly as catalysts in refinery applications such as catalytic cracking and isomerisation, as well as catalysts for the conversion of oxygenates such as methanol and/or dimethyl ether into hydrocarbons.

DETAILED DESCRIPTION

The following examples illustrate and explain the details of the present invention but should not be taken as limiting the present invention in any regard.

EXAMPLE 1

Synthesis of Mesoporous ZSM-5.

$SiO_2$ with partially decomposed carbohydrate was prepared according to the following procedure: 20 g of sucrose was dissolved in 11 g of water. 5 g of mesoporous $SiO_2$ was impregnated with this solution to incipient wetness. The resulting material was dried overnight at room temperature and then calcined in Ar-flow in an oven at 450° C. for 15 hours.

A mesoporous Na-ZSM-5 material was prepared according to the following procedure. In a 100 ml flask, 33.83 g of 20% TPAOH, 8.50 g of $H_2O$, 0.53 g NaOH and 0.08 g of $NaAlO_2$ was added with stirring until a clear solution was obtained. After that the $SiO_2$ with partially decomposed carbohydrate (silica-carbon composite) was added to this mixture. This mixture was left for 1 hour with stirring. The composition of the resulting zeolite synthesis gel was $1 Al_2O_3$:181 $SiO_2$:36 $TPA_2O$:15 $Na_2O$:1029 $H_2O$. Then the gel was introduced into a stainless steel autoclave, heated to 180° C. and kept there for 72 h. The autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 2

Figure 1:
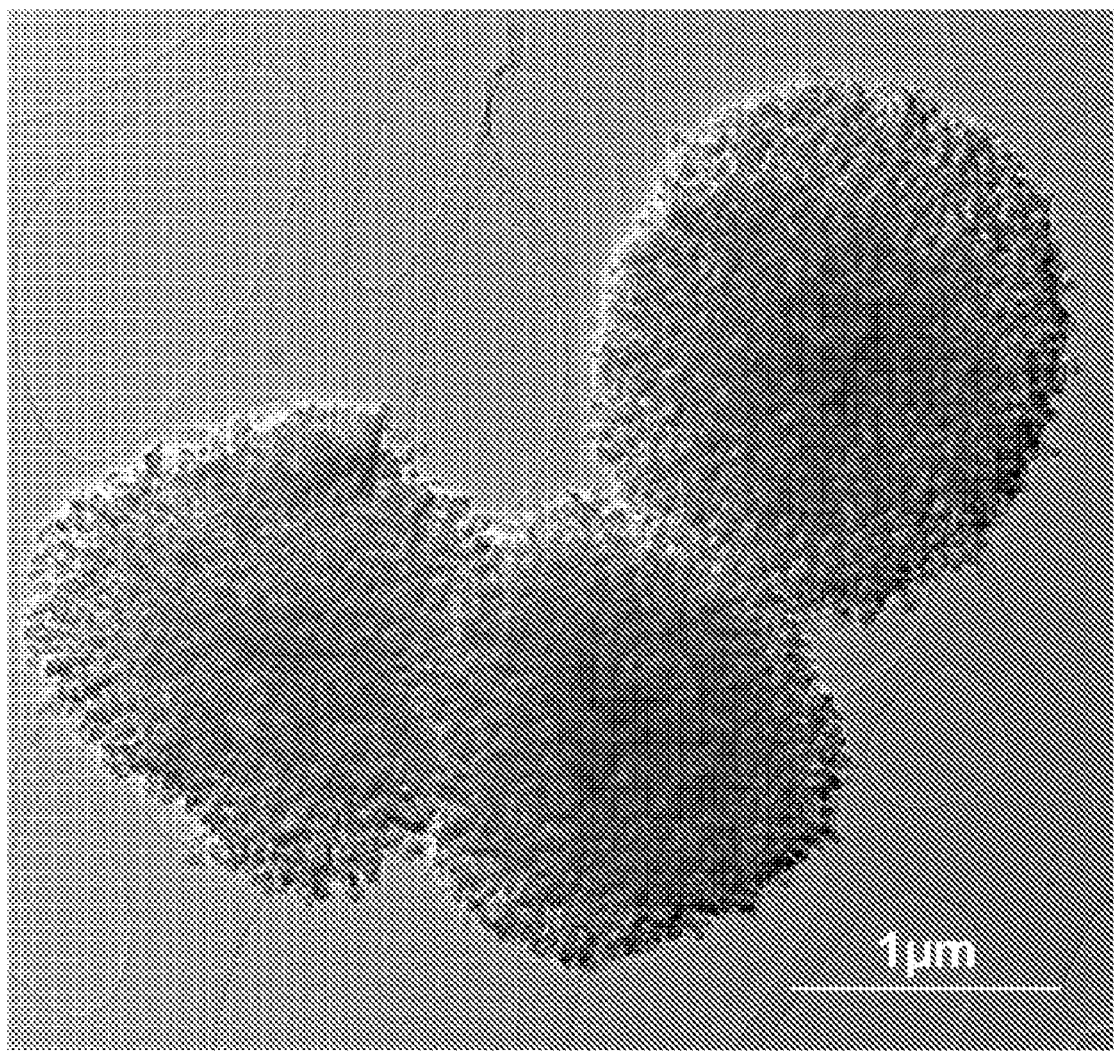
FIG. 1 shows a TEM (Transmission Electron Microscope) graph of ZSM-5-type crystals obtained in Example 1.

Zeolite crystals from Example 1 were characterized by X-ray powder diffraction, $N_2$ physisorption measurements, scanning electron microscopy and transmission electron microscopy after the zeolite synthesis and subsequent combustion of the organic template and the partially decomposed carbohydrates. According to these measurements, all samples contain exclusively highly crystalline MFI-structured materials. TEM of the resulting ZSM-5-type crystals is shown in FIG. 1. It is possible to see large zeolite crystals, which are recognizable as dark areas with brighter areas attributable to porosity. These are mesopores created by removal of the partially decomposed carbohydrate.

EXAMPLE 3

Synthesis of Mesoporous Silicalite-1.

The $SiO_2$ with partially decomposed carbohydrates was prepared as in Example 1. The mesoporous silicalite-1 material was prepared according to the following procedure. In a 100 ml flask, 33.83 g of 20% TPAOH, 8.50 g of $H_2O$ and 0.53 g NaOH was added with stirring until a clear solution was obtained. After that the $SiO_2$ with partially decomposed carbohydrate was added to this mixture. This mixture was left for 1 hour with stirring. The composition of the resulting synthesis gel was 181 $SiO_2$:36 $TPA_2O$:15 $Na_2O$:1029 $H_2O$. Then the gel was introduced into a stainless steel autoclave, heated to 180° C. and kept there for 72 h. Then, the autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 4

Zeolite crystals from Example 3 were characterized by XRPD, $N_2$ physisorption measurements, SEM and TEM after the zeolite synthesis and subsequent combustion of the organic template and the partially decomposed carbohydrates. According to these measurements, all samples contain exclusively highly crystalline MFI-structured materials.

The individual crystals formed in Example 3 were typically of the size 2×1×1 μm³.

EXAMPLE 5

Synthesis of Mesoporous Silicalite-2.

The $SiO_2$ with partially decomposed carbohydrates was prepared as in Example 1. The mesoporous silicalite-2 material was prepared according to the following procedure. In a 100 ml flask, 21.58 g of 40% TBAOH, 30 g of $H_2O$ and 0.53 g NaOH was added with stirring until a clear solution was obtained. After that $SiO_2$ with partially decomposed carbohydrate was added to this mixture. This mixture was left for 1 hour with stirring. The composition of the resulting synthesis gel was 181 $SiO_2$:36 $TBA_2O$:15 $Na_2O$:1029 $H_2O$. Then the gel was introduced into a stainless steel autoclave, heated to 180° C. and kept there for 72 h. Then, the autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 6

Zeolite crystals from Example 5 were characterized by XRPD, $N_2$ physisorption measurements, SEM and TEM after the zeolite synthesis and subsequent combustion of the organic template and the partially decomposed carbohydrates. According to these measurements, all samples contain exclusively highly crystalline MEL-structured materials.

The individual crystals formed in Example 5 were typically of the size 2×1×1 μm³.

EXAMPLE 7

Synthesis of Mesoporous Na-ZSM-11.

The $SiO_2$ with partially decomposed carbohydrates was prepared as in Example 1. The mesoporous Na-ZSM-11 material was prepared according to the following procedure: In a 100 ml flask, 21.58 g of 40% TBAOH, 30 g of $H_2O$, 0.53 g NaOH and 0.08 g of $NaAlO_2$ was added with stirring until a clear solution was obtained. After that $SiO_2$ with partially decomposed carbohydrate was added to this mixture. This mixture was left for 1 hour with stirring. The composition of the resulting synthesis gel was 1 $Al_2O_3$:181 $SiO_2$:36 $TBA_2O$:15 $Na_2O$:1029 $H_2O$. Then the gel was introduced into a stainless steel autoclave, heated to 180° C. and kept there for 72 h. Then, the autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 8

Zeolite crystals from Example 7 were characterized by XRPD, $N_2$ physisorption measurements, SEM and TEM after the zeolite synthesis and subsequent combustion of the organic template and the partially decomposed carbohydrates. According to these measurements, all samples contain exclusively highly crystalline MEL-structured materials.

The individual crystals formed in Example 3 were typically of the size 2×1×1 μm³.

EXAMPLE 9

Synthesis of Mesoporous NaY.

The $SiO_2$ with partially decomposed carbohydrates were prepared as in Example 1.

For the synthesis of mesoporous NaY a seed gel was prepared according to the following procedure: in a 100 ml flask 9.3 ml of sodium aluminate solution (240 g/l $Al_2O_3$), 19.97 ml of sodium hydroxide solution (400 g/l $Na_2O$) and 50 ml of sodium silicate solution (200 g/l $SiO_2$) were added slowly with stirring. After that the mixture was left for 4 hours. The synthesis gel for mesoporous NaY was prepared by the following procedure: in 200 ml flask 36.62 ml of sodium aluminate solution (240 g/l $Al_2O_3$), 19.62 ml of sodium hydroxide solution (400 g/l $Na_2O$) and 45.5 ml of sodium silicate (200 g/l $SiO_2$) were added slowly with stirring. After that, 12.5 g of $SiO_2$ with partially decomposed carbohydrate and 2.5 ml of seed gel were added slowly. The mixture was left for 1 hour with stirring. The composition of the resulting synthesis gel was 1 $Al_2O_3$:7 $SiO_2$:5 $Na_2O$:85 $H_2O$. Then the gel was introduced into a stainless steel autoclave, heated to 100° C. and kept there for 24 h. The autoclave was cooled to room temperature; the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 10

Figure 2:
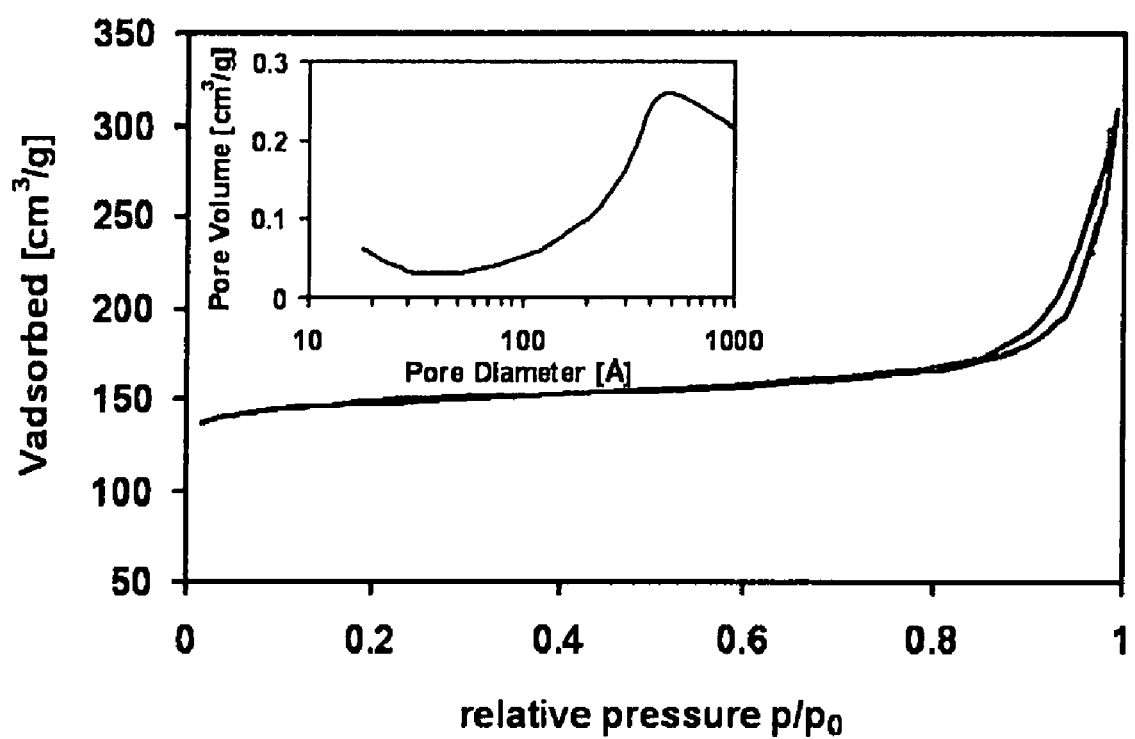
FIG. 2 shows nitrogen adsorption/desorption isotherms of NaY zeolite crystals of Example 9.

Zeolite crystals from Example 9 were characterized by XRPD, $N_2$ physisorption measurements, SEM and TEM after the zeolite synthesis and subsequent combustion of the organic template and the partially decomposed carbohydrates. According to these measurements, all samples contain exclusively highly crystalline FAU structured materials. The nitrogen adsorption/desorption isotherms and the pore size distribution of the NaY zeolite after combustion of the partially decomposed carbohydrate are shown in FIG. 2. The isotherm is seen to contain the hysteresis loop that is common for mesoporous materials. From the pore size distribution of the synthesized NaY zeolite shown in FIG. 2, it is clearly seen that the material has mesopores in the range of 500 Å.

The individual crystals formed in Example 3 were typically of the size 2×1×1 μm³.

EXAMPLE 11

$N_2$ physisorption characteristics of the mesoporous materials obtained by following Example 1 (NaZSM-5), Example 7 (NaZSM-11) and Example 9 (NaY) are summarized in Table 1.

TABLE 1

| Sample | $V_{micro}$ $(cm^3/g)^a$ | $V_{meso}$ $(cm^3/g)^b$ | BET area $(m^2/g)^c$ | Average pore size (Å) |
|---|---|---|---|---|
| Example 1 (ZSM-5) | 0.15 | 0.24 | 340 | 100 |
| Example 7 (ZSM-11) | 0.10 | 0.24 | 292 | 200 |
| Example 9 (NaY) | 0.19 | 0.31 | 493 | 500 |

[a] Calculated by t-plot method.
[b] Calculated by BJH method.

TABLE 1-continued

| Sample | $V_{micro}$ $(cm^3/g)^a$ | $V_{meso}$ $(cm^3/g)^b$ | BET area $(m^2/g)^c$ | Average pore size (Å) |
|---|---|---|---|---|

[c]Calculated by BET method.

EXAMPLE 12

Synthesis of conventional ZSM-5 without sucrose for comparison with the mesoporous NaZSM-5 prepared by following Example 1.

Na-ZSM-5 material was prepared without the use of carbohydrate according to the following procedure: In a 100 ml flask, 33.83 g of 20% TPAOH, 8.50 g of $H_2O$, 0.53 g NaOH and 0.08 g of $NaAlO_2$ was added with stirring until a clear solution was obtained. After that 5 g $SiO_2$ was added to this mixture. This mixture was left for 1 hour with stirring. The composition of the resulting synthesis gel was 1 $Al_2O_3$:181 $SiO_2$:36 $TPA_2O$:15 $Na_2O$:1029 $H_2O$. Then the gel was introduced into a stainless steel autoclave, heated to 180° C. and kept there for 72 h. The autoclave was cooled to room temperature, the product was suspended in water, filtered by suction, resuspended in water and filtered again. Finally, the product was dried at 110° C. for 10 h and the organic template was removed by controlled combustion in air in a muffle furnace at 550° C. for 20 h.

EXAMPLE 13

Zeolite crystals from Example 13 were characterized by XRPD, $N_2$ physisorption measurements and SEM after the zeolite synthesis and subsequent combustion of the organic template. According to these measurements, the sample contains exclusively highly crystalline MFI-structured material. The results of the $N_2$ adsorption measurements of the conventional ZSM-5 type material obtained by following Example 12 are presented in Table 2. Also presented in Table 2 are the results of the $N_2$ adsorption measurements for a mesoporous material obtained by following Example 1.

TABLE 2

| Sample | Mesoporous/ Conventional | $V_{micro}$ $(cm^3/g)^a$ | $V_{meso}$ $(cm^3/g)^b$ | BET area $(m^2/g)^c$ |
|---|---|---|---|---|
| ZSM-5 (Example 12) | conventional | 0.14 | — | 374 |
| ZSM-5 (Example 1) | mesoporous | 0.15 | 0.24 | 340 |

[a]Calculated by t-plot method.
[b]Calculated by BJH method.
[c]Calculated by BET method.

EXAMPLE 14

Synthesis of Mesoporous Silicalite-1.

A mesoporous silicalite-1 material was prepared using the following procedure: 25.0 ml TEOS, 30.0 ml $H_2O$, 65.5 g sucrose and 20.0 ml EtOH were mixed by magnetic stirring at 50° C. To this mixture, a solution made by mixing 18.0 ml EtOH, 5.0 ml $H_2O$, 3.0 ml 25 wt % $NH_3$ and 3.0 ml 0.5 M $NH_4F$ was added under vigorous stirring at the same temperature. After 1.5 h a transparent gel formed, which was gelled at 50° C. for 2 days. One sixth (⅙) of this gel was impregnated with 5.0 ml TPAOH (1.0 M) and dried overnight at ambient conditions. The composition of the resulting gel was: 7.6 $SiO_2$:1 TPAOH:13.0 sucrose:44.1 EtOH:3.0 $NH_3$:2.8 $NH_4F$: 240 $H_2O$. Then the gel was transferred to an autoclave and heated to 180° C. for 3 days. The autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 15

Figure 3:
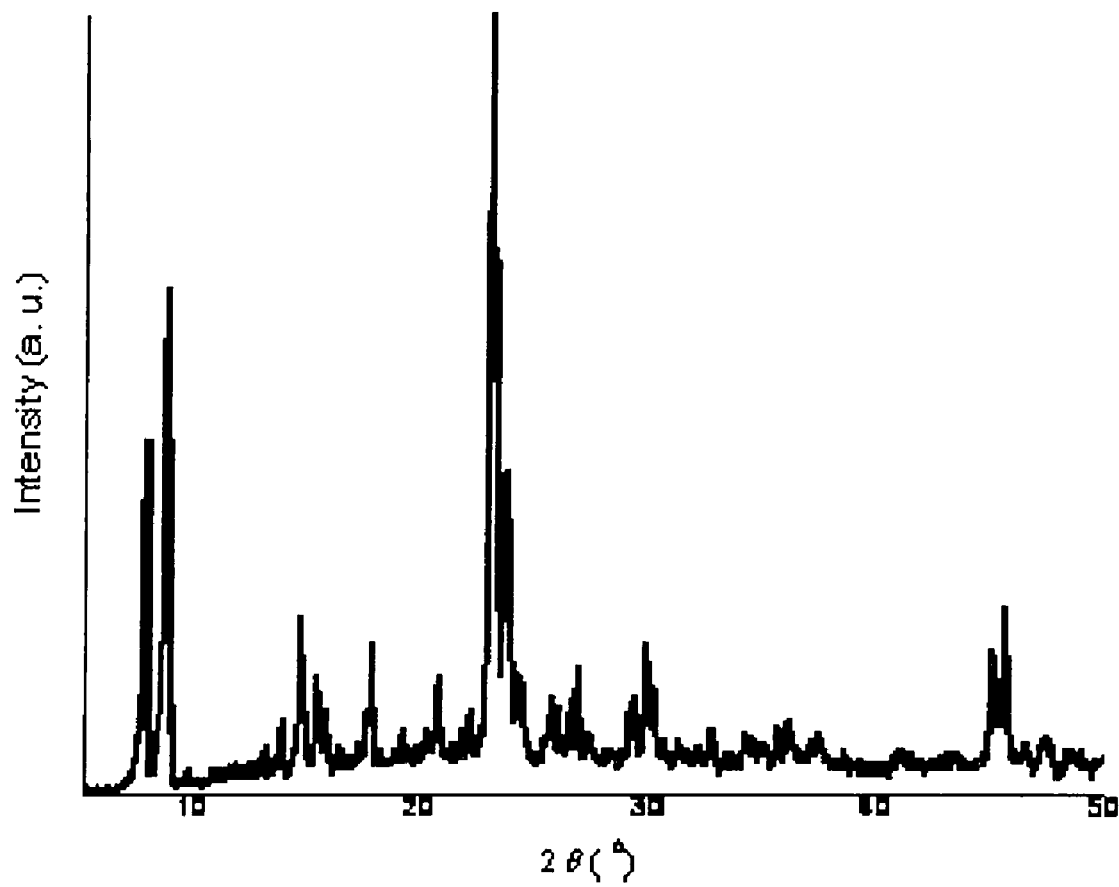
FIG. 3 shows a XRPD spectrum of crystalline MFI-structured materials of Example 14.

Zeolite crystals from Example 14 were characterized by XRPD, $N_2$ physisorption measurements, SEM and TEM after the zeolite synthesis and subsequent combustion of the organic template and the partially decomposed carbohydrate. According to these measurements, all samples contain exclusively highly crystalline MFI-structured material as seen in FIG. 3. The $N_2$ physisorption measurements showed that the material prepared has mesopores ranging from 20 to 30 nm in diameter amounting to a total pore volume of 0.30 $cm^3$/g.

EXAMPLE 16

Synthesis of Mesoporous Silicalite-1.

A mesoporous silicalite-1 material was prepared using the following procedure: 13.1 g of sucrose was dissolved in a mixture of 15.0 ml 40 wt % TPAOH, 10.0 ml EtOH and 10.0 ml TEOS under stirring at 50° C. To this mixture, a solution made by mixing 0.6 ml 25 wt % $NH_3$, 0.6 ml 0.5 M $NH_4F$ and 3.0 ml EtOH was added and the resulting mixture was stirred for 1.5 h at the same temperature. The composition of the resulting gel was: 1.5 $SiO_2$:1 TPAOH:1.3 sucrose:5.8 EtOH: 0.3 $NH_3$:0.3 $NH_4F$:18.3 $H_2O$. Then the gel was transferred to an autoclave and heated to 180° C. for 5 days. The autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 17

Figure 4:
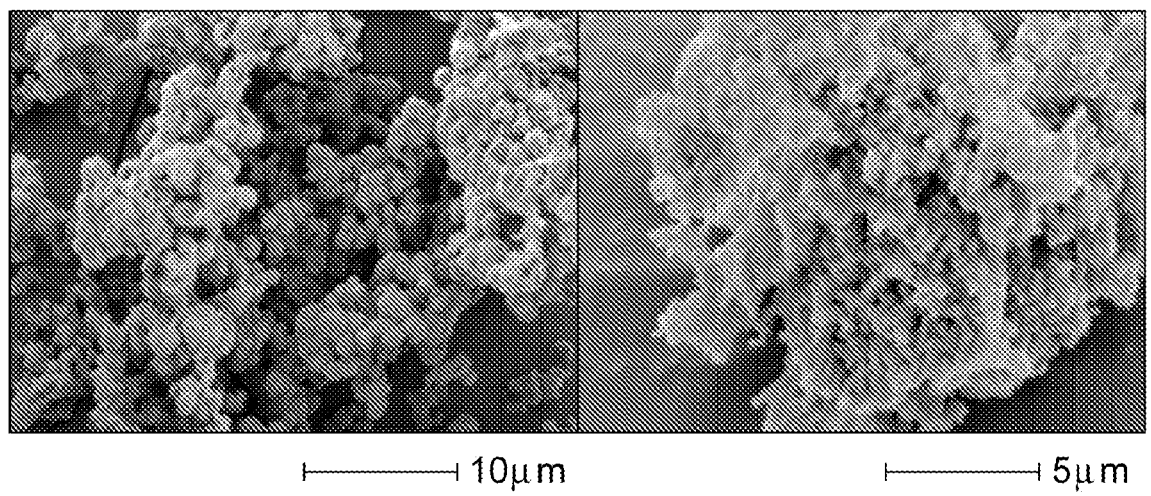
FIG. 4 shows SEM (Scanning Electronic Microscope) images of crystalline MFI-structured materials of Example 16.
Figure 5:
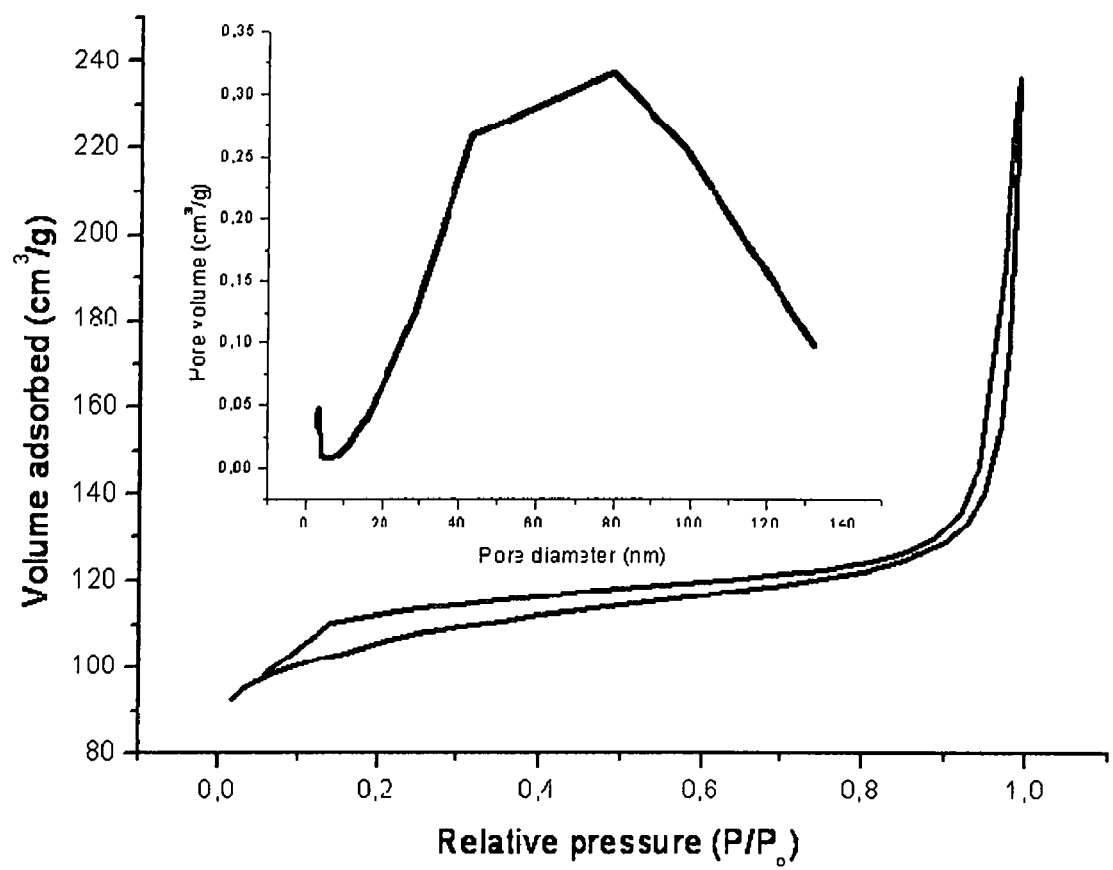
FIG. 5 shows the pore size distribution and results of $N_2$ physisorption measurements of crystalline MFI-structured materials of Example 16.

Zeolite crystals from Example 16 were characterized by XRPD, $N_2$ physisorption measurements, SEM, and TEM after the zeolite synthesis and subsequent combustion of the organic template and the partially decomposed carbohydrate. According to these measurements, all samples contain exclusively highly crystalline MFI-structured material. SEM images of the prepared material are shown in FIG. 4. The $N_2$ physisorption measurements showed that the material prepared has mesopores ranging from 20 to 50 nm in diameter as shown in FIG. 5.

EXAMPLE 18

Synthesis of Mesoporous Silicalite-1.

A mesoporous silicalite-1 material was prepared using the following procedure: 25.0 ml TEOS, 30.0 ml $H_2O$, 65.5 g sucrose and 20.0 ml EtOH were mixed by magnetic stirring at 50° C. To this mixture, a solution made by mixing 18.0 ml EtOH, 5.0 ml $H_2O$, 3.0 ml 25 wt % $NH_3$ and 3.0 ml 0.5 M $NH_4F$ was added under vigorous stirring at the same temperature. After 1.5 h a transparent gel formed, which was gelled at 50° C. for 2 days. Then the gel was transferred to an autoclave and heated to 180° C. for 2 days producing a brown solid, which turned black upon being heated in a flow of Ar at 850° C. for 5 h. The black solid obtained in this way was impregnated with a mixture of 3.0 g 40 wt % TPAOH and 1 ml EtOH. The composition of the resulting gel was approximately: 2.8 $SiO_2$:1 TPAOH:2.9 EtOH:17 $H_2O$. Then the gel was transferred to an autoclave and heated to 180° C. for 3 days. The autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 19

Figure 6:
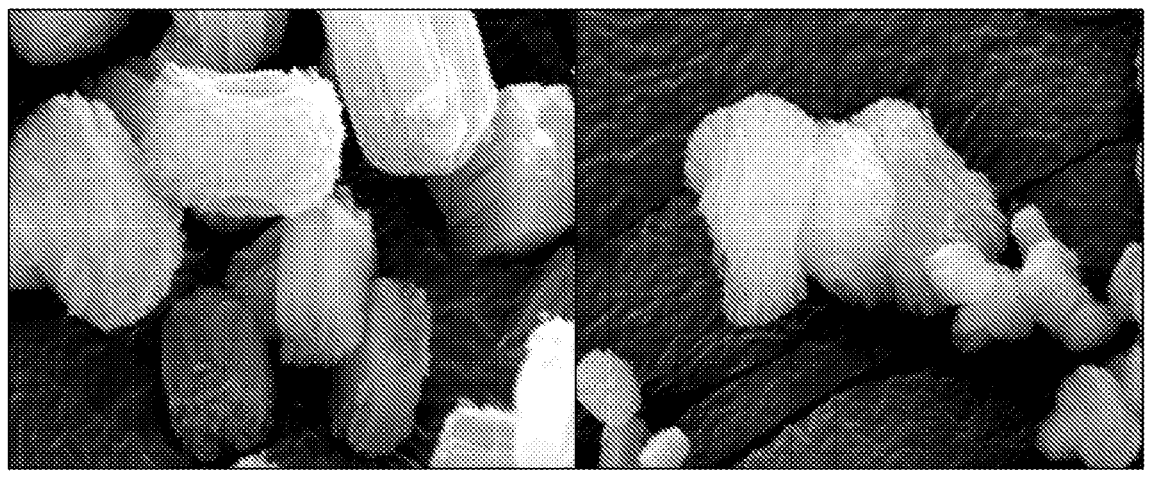
FIG. 6 shows SEM images of crystalline MFI-structured materials of Example 18.

Zeolite crystals from Example 18 were characterized by XRPD, $N_2$ physisorption measurements, SEM, and TEM after the zeolite synthesis and subsequent combustion of the organic template and the partially decomposed carbohydrate. According to these measurements, all samples contain exclusively highly crystalline MFI-structured material. SEM images of the prepared mesoporous material are shown in FIG. 6.

EXAMPLE 20

Synthesis of Mesoporous Silicalite-1.

A mesoporous silicalite-1 material was prepared using the following procedure: 13.1 g sucrose was dissolved into a mixture of 9.6 ml EtOH, 7.5 ml H2O and 1.0 ml of 25 wt % $NH_3$ under stirring at 50° C. After 1.5 h, the material was transferred to a Teflon beaker and hydrothermally treated at 180° C. for 2 days producing a brown solid, which turned black upon being heated in a flow of Ar at 850° C. for 5 h. 2.5 g of the black solid obtained in this way was impregnated with a mixture of 3.4 g 40 wt % TPAOH and 2.0 ml EtOH and the mixture was dried in air overnight at ambient conditions. Then, the material was impregnated with 3.0 ml TEOS which was allowed to hydrolyze in air for 1 day. The composition of the resulting gel was: 2.0 $SiO_2$:1 TPAOH:5.1 EtOH:17.0 $H_2O$. Then the gel was transferred to an autoclave and heated to 180° C. for 3 days. The autoclave was cooled to room temperature, the product was suspended in water, filtered by suction, resuspended in water and filtered again. Finally, the product was dried at 110° C. for 10 h and the organic template and the partially decomposed carbohydrates were removed by controlled combustion in air in a muffle furnace at 550° C. for 20 h.

EXAMPLE 21

Figure 7:
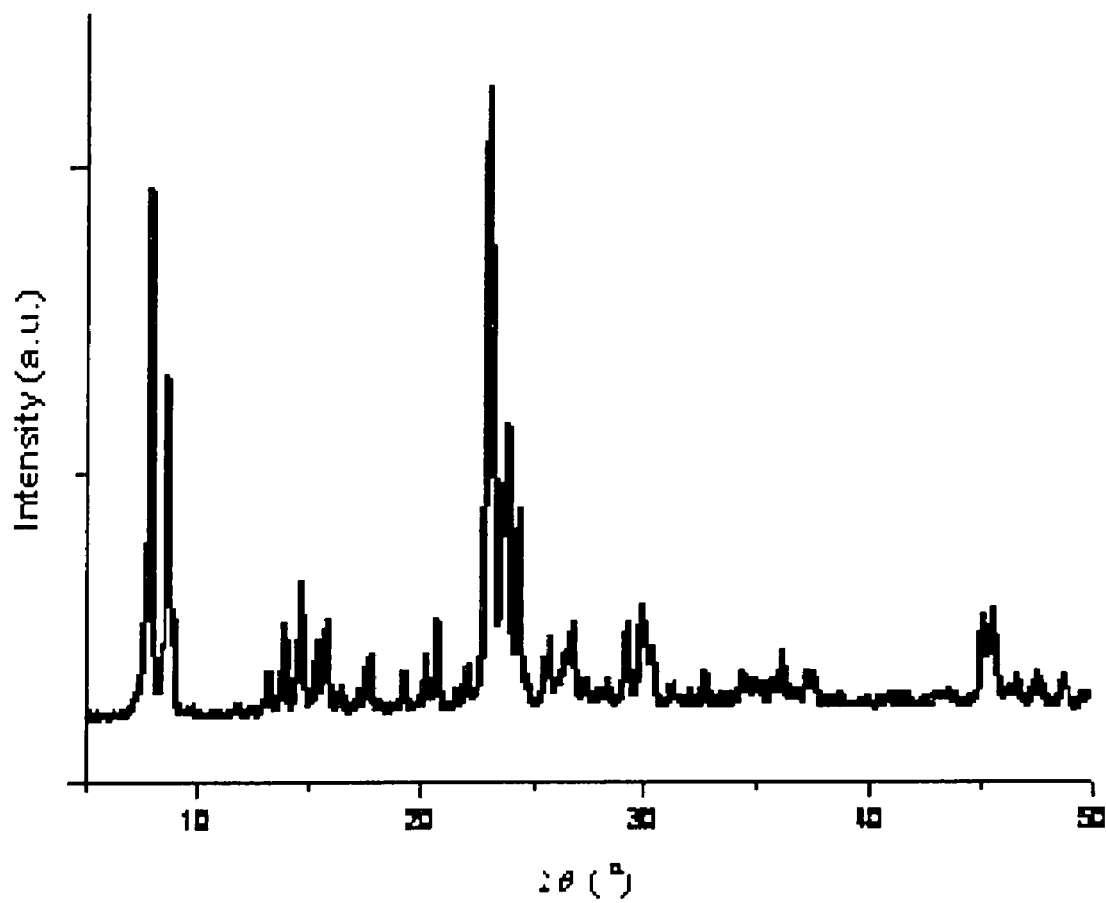
FIG. 7 shows a XRPD spectrum of crystalline MFI-structured materials of Example 20.
Figure 8:
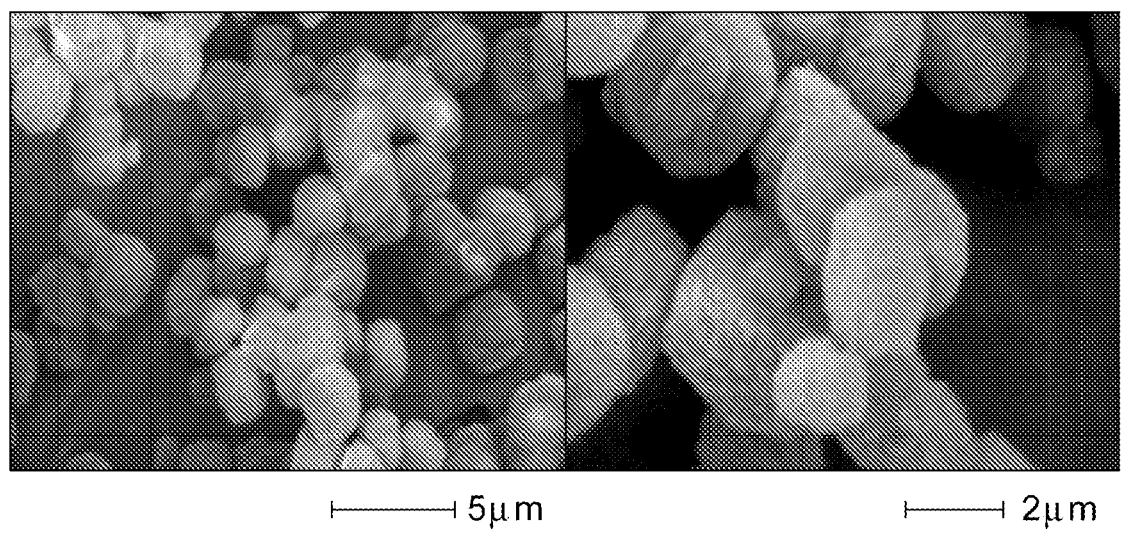
FIG. 8 shows SEM images of crystalline MFI-structured materials of Example 20.
Figure 9:
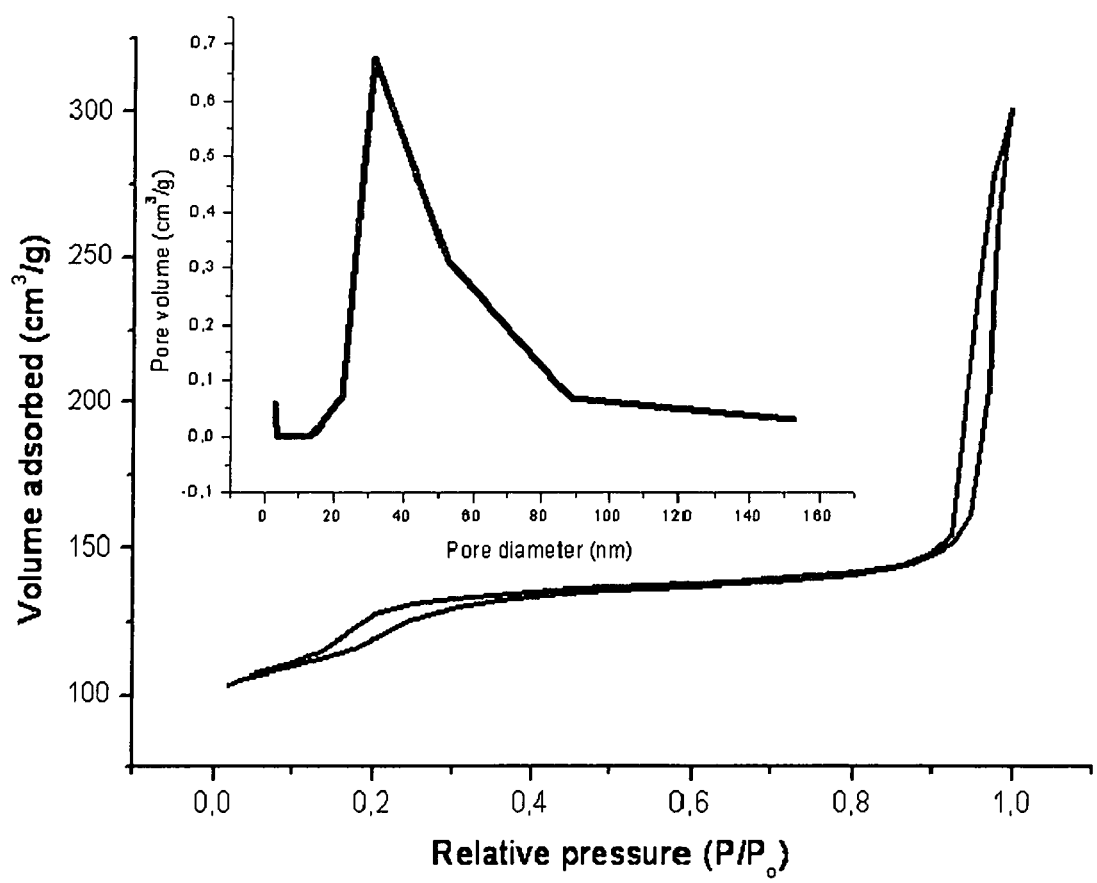
FIG. 9 shows the pore size distribution and results of $N_2$ physisorption measurements of crystalline MFI-structured materials of Example 20.

Zeolite crystals from Example 20 were characterized by XRPD, $N_2$ physisorption measurements, SEM, and TEM after the zeolite synthesis and subsequent combustion of the organic template and the partially decomposed carbohydrate. According to these measurements, all samples contain exclusively highly crystalline MFI-structured material as shown in FIG. 7. SEM images of the prepared mesoporous material are shown in FIG. 8. Pore size distribution and $N_2$ physisorption isotherm for the prepared material are shown in FIG. 9.

EXAMPLE 22

$N_2$ physisorption characteristics of the mesoporous silicalite-1 materials obtained by following Example 14, Example 16, Example 18 and Example 20 are summarized in Table 3.

TABLE 3

| Sample | $V_{micro}$ $(cm^3/g)^a$ | $V_{meso}$ $(cm^3/g)^b$ | BET area $(m^2/g)^c$ | Average pore size (Å) |
|---|---|---|---|---|
| Example 14 (silicalite-1) | 0.03 | 0.29 | 370 | 200 |
| Example 16 (silicalite-1) | 0.09 | 0.22 | 367 | 600 |
| Example 18 (silicalite-1) | 0.02 | 0.17 | 417 | 500 |
| Example 20 (silicalite-1) | 0.09 | 0.34 | 403 | 530 |

$^a$Calculated by t-plot method.
$^b$Calculated by BJH method.
$^c$Calculated by BET method.

The invention claimed is:

1. A method for producing zeolite or zeotype crystals with a hierarchical pore system having both pores with average diameter between 0.3-2 nm and pores with an average diameter size larger than 4 nm in diameter, comprising the steps of:
    applying a carbohydrate or a carbohydrate solution onto a zeolite precursor material or into a zeolite precursor composition;
    partly or fully decomposing the carbohydrate;
    crystallizing the zeolite; and
    removing the partly or fully decomposed carbohydrate by calcination or combustion.

2. The method of claim 1, where the carbohydrate is applied as an aqueous solution.

3. The method of claim 1, where the steps of partly decomposing the carbohydrate and crystallizing the zeolite are conducted as a combined single step.

4. The method of claim 3, where the combined single step is conducted at a temperature between 80-400° C.

5. The method of claim 1, where the carbohydrate is partly decomposed at a temperature between 90-900° C.

6. The method of claim 1, where the zeolite is crystallized at a temperature between 70 and 300° C.

7. The method of claim 1, where the partly decomposed carbohydrate is removed by calcination or combustion at a temperature above 300° C.

* * * * *